US012717712B2

(12) United States Patent
Tan et al.

(10) Patent No.: US 12,717,712 B2
(45) Date of Patent: Aug. 25, 2026

(54) DYNAMIC READ DISTURB MANAGEMENT ALGORITHM FOR FLASH-BASED MEMORY

(71) Applicant: Micron Technology, Inc., Boise, ID (US)

(72) Inventors: Hua Tan, Shanghai (CN); Zhen Shu, Shanghai (CN); Nicola Colella, Capodrise (IT)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/268,292

(22) PCT Filed: Dec. 23, 2020

(86) PCT No.: PCT/CN2020/138570
§ 371 (c)(1),
(2) Date: Jun. 19, 2023

(87) PCT Pub. No.: WO2022/133787
PCT Pub. Date: Jun. 30, 2022

(65) Prior Publication Data

US 2024/0054070 A1 Feb. 15, 2024

(51) Int. Cl.
*G06F 12/02* (2006.01)

(52) U.S. Cl.
CPC ................................ *G06F 12/0246* (2013.01)

(58) Field of Classification Search
CPC .................................................. G06F 12/0246
USPC ......................................................... 711/103
See application file for complete search history.

(56) References Cited

U.S. PATENT DOCUMENTS 10,115,472 B1 * 10/2018 Camp ................ G11C 16/3427
2009/0310406 A1 * 12/2009 Sarin .................. G11C 11/5628 365/185.12
2009/0327804 A1 * 12/2009 Moshayedi ........... G06F 3/0659 711/E12.001
2018/0053562 A1 2/2018 Reusswig et al.
(Continued)

FOREIGN PATENT DOCUMENTS

CN 101809541 A 8/2010
WO WO-2022133787 A1 6/2022

OTHER PUBLICATIONS

"International Application Serial No. PCT/CN2020/138570, International Search Report mailed Sep. 27, 2021", 4 pgs.
(Continued)

*Primary Examiner* — Gautam Sain
(74) *Attorney, Agent, or Firm* — Schwegman Lundberg & Woessner, P.A.

(57) ABSTRACT

A memory device comprises a memory array and a memory controller operatively coupled to the memory array. The memory controller includes a processor configured to initiate read operations to the memory array; compare the number of read operations to a predetermined threshold number of read operations; initiate scanning memory pages of a block of memory cells for errors in response to reaching the threshold number of read operations for the block; and iteratively change the threshold number to a new threshold number, perform the new threshold number of read operations on the block of memory cells, and error scan memory pages associated with the last read operation of the new threshold number of read operations.

20 Claims, 6 Drawing Sheets

(56) References Cited

U.S. PATENT DOCUMENTS

| | | | | |
|---|---|---|---|---|
| 2018/0197619 | A1* | 7/2018 | Chen | G11C 11/5628 |
| 2018/0374549 | A1* | 12/2018 | Padilla | G11C 16/3422 |
| 2019/0066739 | A1* | 2/2019 | Muchherla | G11C 29/028 |
| 2019/0066809 | A1* | 2/2019 | Kumar | G11C 29/50004 |
| 2019/0272881 | A1 | 9/2019 | Padilla et al. | |
| 2019/0287632 | A1* | 9/2019 | Asano | G11C 16/3495 |

OTHER PUBLICATIONS

"International Application Serial No. PCT/CN2020/138570, Written Opinion mailed Sep. 27, 2021", 4 pgs.

"International Application Serial No. PCT CN2020 138570, International Preliminary Report on Patentability mailed Jul. 6, 2023", 6 pages.

* cited by examiner

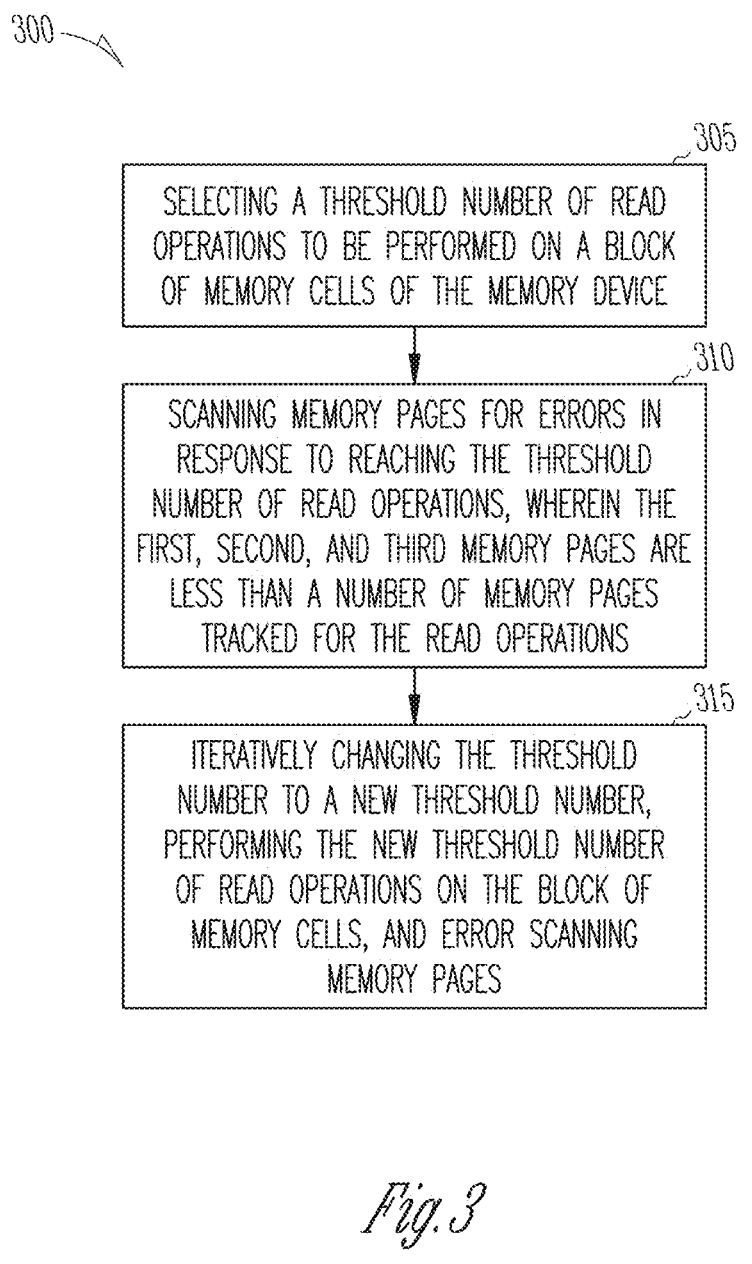

300

305
SELECTING A THRESHOLD NUMBER OF READ OPERATIONS TO BE PERFORMED ON A BLOCK OF MEMORY CELLS OF THE MEMORY DEVICE

310
SCANNING MEMORY PAGES FOR ERRORS IN RESPONSE TO REACHING THE THRESHOLD NUMBER OF READ OPERATIONS, WHEREIN THE FIRST, SECOND, AND THIRD MEMORY PAGES ARE LESS THAN A NUMBER OF MEMORY PAGES TRACKED FOR THE READ OPERATIONS

315
ITERATIVELY CHANGING THE THRESHOLD NUMBER TO A NEW THRESHOLD NUMBER, PERFORMING THE NEW THRESHOLD NUMBER OF READ OPERATIONS ON THE BLOCK OF MEMORY CELLS, AND ERROR SCANNING MEMORY PAGES

*Fig. 3*

DYNAMIC READ DISTURB MANAGEMENT ALGORITHM FOR FLASH-BASED MEMORY

PRIORITY APPLICATION

This application is a U.S. National Stage Application under 35 U.S.C. 371 from International Application No. PCT/CN2020/138570, filed 23 Dec. 2020, published as WO 2022/133787, which is incorporated herein by reference in its entirety.

BACKGROUND

Memory devices are typically provided as internal, semiconductor, integrated circuits in computers or other electronic devices. There are many different types of memory including volatile and non-volatile memory. Volatile memory can require power to maintain data and includes random-access memory (RAM), dynamic random-access memory (DRAM), and synchronous dynamic random-access memory (SDRAM), among others. Non-volatile memory can provide persistent data by retaining stored data when not powered and can include NAND flash memory, NOR flash memory, read only memory (ROM), Electrically Erasable Programmable ROM (EEPROM), Erasable Programmable ROM (EPROM), and resistance variable memory such as phase change random access memory (PCRAM), resistive random-access memory (RRAM), and magnetoresistive random access memory (MRAM), 3D XPoint™ memory, among others.

Memory cells are typically arranged in a matrix or an array. Multiple matrices or arrays can be combined into a memory device, and multiple devices can be combined to form a storage volume of a memory system, such as a solid-state drive (SSD), a Universal Flash Storage (UFS™) device, a MultiMediaCard (MMC) solid-state storage device, an embedded MMC device (eMMC™), etc., as discussed further below.

Memory devices may experience failure as a function of time and use. A "read disturb" is a failure mechanism that can occur in read operations for a flash-based memory product. Continuous read stress on a NAND word-line can disturb the neighboring word lines especially the adjacent word lines. This can result in errors in the pages of memory connected to the adjacent word lines.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 3 is a flow diagram of an example of a method of operating a memory device according to some examples described herein.

DETAILED DESCRIPTION

Figure 1A:
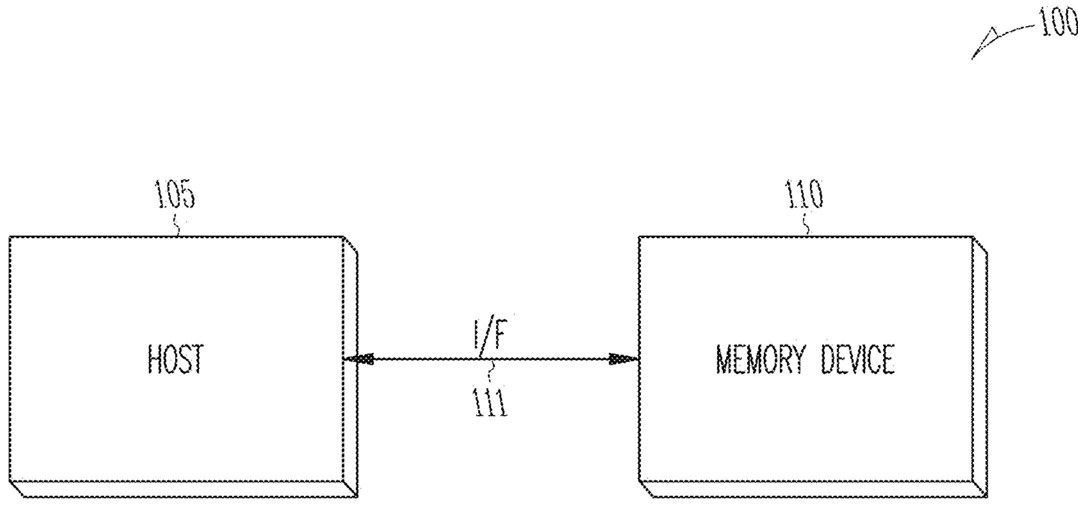
FIG. 1A illustrates an example system including a host device and a memory device according to some examples described herein.

Memory devices can include arrays of memory cells. Managed memory devices can include a memory controller to control or manage access to memory arrays typically formed of multiple individual memory die, and operated according to memory management protocols as may be established, in some examples in accordance with an established industry standard operation. Memory controllers may also perform error detection and correction of data stored in the memory device. As explained previously herein, when reading data from a page in memory, read stress can cause read disturb errors in adjacent memory pages. If read disturb events are not managed well by the memory controller, the host data on the disturbed pages could be lost. However, over-managing read disturb events to avoid loss of host data can waste memory resources, which can negatively impact memory performance and power consumption. Proper management of the read disturb effect is an important consideration for managed memory devices.

Memory devices include individual memory die, which may, for example, include including a storage region comprising one or more arrays of memory cells, implementing one (or more) selected storage technologies. Such memory die will often include support circuitry for operating the memory array(s). Other examples, sometimes known generally as "managed memory devices," include assemblies of one or more memory die associated with controller functionality configured to control operation of the one or more memory die. Such controller functionality can simplify interoperability with an external device, as a "host" device as discussed later herein. In such managed memory devices, the controller functionality may be implemented on one or more die also incorporating a memory array, or on a separate die. In other examples, one or more memory devices may be combined with controller functionality to form a solid-stage drive (SSD) storage volume.

Embodiments of the present disclosure are described in the example of managed memory devices implementing NAND flash memory cells. These examples, however, are not limiting on the scope of the disclosure, which may be implemented in other forms of memory devices and/or with other forms of storage technology.

Both NOR and NAND flash architecture semiconductor memory arrays are accessed through decoders that activate specific memory cells by selecting the word line coupled to their gates. In a NOR architecture semiconductor memory array, once activated, the selected memory cells place their data values on bit lines, causing different currents to flow depending on the state at which a particular cell is programmed. In a NAND architecture semiconductor memory array, a high bias voltage is applied to a drain-side select gate (SGD) line. Word lines coupled to the gates of the unselected memory cells of each group are driven at a specified pass voltage (e.g., Vpass) to operate the unselected memory cells of each group as pass transistors (e.g., to pass current in a manner unrestricted by their stored data values). Current then flows from the source line to the bit line through each series coupled group, restricted only by the selected memory cells of each group, placing current encoded data values of selected memory cells on the bit lines.

Each flash memory cell in a NOR or NAND architecture semiconductor memory array can be programmed individually or collectively to one or a number of programmed states. For example, a single-level cell (SLC) can represent one of two programmed states (e.g., 1 or 0), representing one bit of data. Flash memory cells can also represent more than two programmed states, allowing the manufacture of higher density memories without increasing the number of memory cells, as each cell can represent more than one binary digit (e.g., more than one bit). Such cells can be referred to as multi-state memory cells, multi-digit cells, or multi-level cells (MLCs). In certain examples, MLC can refer to a memory cell that can store two bits of data per cell (e.g., one of four programmed states), a triple-level cell (TLC) can refer to a memory cell that can store three bits of data per cell (e.g., one of eight programmed states), and a quad-level cell (QLC) can store four bits of data per cell. MLC is used herein in its broader context, to refer to any memory cell(s) that can store more than one bit of data per cell (i.e., that can represent more than two programmed states).

Managed memory devices may be configured and operated in accordance with recognized industry standards. For example, managed NAND devices may be (as non-limiting examples), a Universal Flash Storage (UFS™) device, an embedded MMC device (eMMC™), etc. For example, in the case of the above examples, UFS devices may be configured in accordance with Joint Electron Device Engineering Council (JEDEC) standards (e.g., JEDEC standard JESD223D, entitled "JEDEC UFS Flash Storage 3.0," and/or updates or subsequent versions to such standard). Similarly, identified eMMC devices may be configured in accordance with JEDEC standard JESD84-A51, entitled "JEDEC eMMC standard 5.1," and/or updates or subsequent versions to such standard. The identified standards are provided only as example environments in which the described methods and structures may be utilized, but such methods and structures may be utilized in a variety of environments outside of the identified standards (or of any other actual or proposed standards), except as expressly indicated herein.

An SSD can be used as, among other things, the main storage device of a computer, having advantages over traditional hard drives with moving parts with respect to, for example, performance, size, weight, ruggedness, operating temperature range, and power consumption. For example, SSDs can have reduced seek time, latency, or other delay associated with magnetic disk drives (e.g., electromechanical, etc.). SSDs use non-volatile memory cells, such as flash memory cells to obviate internal battery supply requirements, thus allowing the drive to be more versatile and compact. Managed memory devices, for example managed NAND devices, can be used as primary or ancillary memory in various forms of electronic devices, and are commonly used in mobile devices.

Both SSDs and managed memory devices can include a number of memory devices, including a number of dies or logical units (e.g., logical unit numbers or LUNs), and can include one or more processors or other controllers performing logic functions required to operate the memory devices or interface with external systems. Such SSDs and managed memory devices can include one or more flash memory die, including a number of memory arrays and peripheral circuitry thereon. The flash memory arrays can include a number of blocks of memory cells organized into a number of physical pages. In some examples, the SSDs can also include DRAM or SRAM (or other forms of memory die or other memory structures). Similarly, managed NAND devices can include one or more arrays of volatile and/or nonvolatile memory separate from the NAND storage array, and either within or separate from a controller. Both SSDs and managed NAND devices can receive commands from a host in association with memory operations, such as read or write operations to transfer data (e.g., user data and associated integrity data, such as error data and address data, etc.) between the memory devices and the host, or erase operations to erase data from the memory devices.

FIG. 1A illustrates an example system 100 including a host 105 and a memory device 110. The host 105 can include a host processor, a central processing unit, or one or more other device, processor, or controller. The memory device 110 can include one or more other memory devices, or the communication interface 111 can include one or more other interfaces, depending on the host 105 and the memory device 110.

Each of the host 105 and the memory device 110 can include a number of receiver or driver circuits configured to send or receive signals over the communication interface 111, or interface circuits, such as data control units, sampling circuits, or other intermedia circuits configured to process data to be communicated over, or otherwise process data received from the communication interface 111 for use by the host 105, the memory device 110, or one or more other circuits or devices.

The memory device 110 can include a memory array (e.g., one or more arrays of memory cells, such as a NAND flash memory array, or one or more other memory arrays), a memory controller, and in certain examples, an interface circuit between the memory array and the memory controller. In certain examples, the memory device can include a number of memory die, each having control logic separate from the memory controller. The memory controller can include an application specific integrated circuit (ASIC), a field programmable gate array (FPGA), or one or more other processing circuits arranged or programmed to manage data transfers or operations to, from, or within the memory array.

Figure 1B:
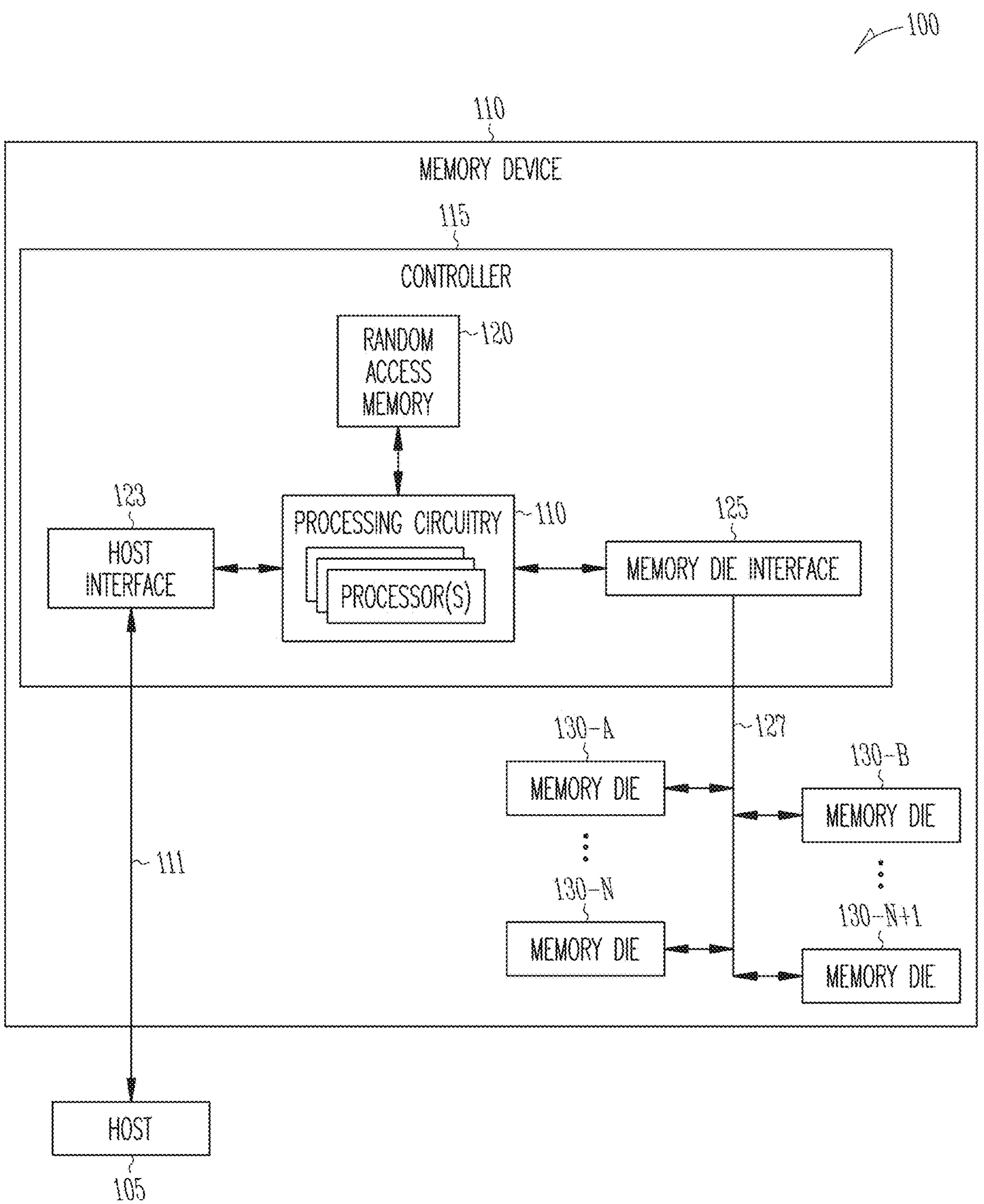
FIG. 1B illustrates another example system including a host device and a memory device according to some examples described herein.

FIG. 1B illustrates an example of an environment 100 including a host device 105 and a memory device 110 configured to communicate over a communication interface 111. The host device 105 or the memory device 110 may be included in a variety of products, such as Internet of Things (IoT) devices (e.g., a refrigerator or other appliance, sensor, motor or actuator, mobile communication device, automobile, drone, etc.) to support processing, communications, or control of the product.

The memory device 110 includes a memory controller 115 and a memory array 120 including, for example, a number of individual memory die (e.g., a stack of 3D NAND die). In an example, the memory device 110 may be a discrete memory or storage device component of the host device 105. In other examples, the memory device 110 may be a portion of an integrated circuit (e.g., system on a chip (SOC), etc.), stacked or otherwise included with one or more other components of the host device 105. In these examples, the memory device 110 communicates with host device 105 components via communication interface 111. Thus, as described herein, a host, or host device 105 operation is distinct from those of the memory device 110, even when the memory device 110 is integrated into the host device 105.

Various forms of communication interfaces may be used to transfer data between the memory device 110 and one or more other components of the host device 105, such as a Serial Advanced Technology Attachment (SATA) interface, a Peripheral Component Interconnect Express (PCIe) interface, a Universal Serial Bus (USB) interface, a Universal Flash Storage (UFS) interface, an eMMC™ interface, or one or more other connectors or interfaces. The host device 105 may include a host system, an electronic device, a processor, a memory card reader, or one or more other electronic devices external to the memory device 110. In some examples, the host 105 may be a machine having some portion, or all, of the components discussed in reference to the machine 500 of FIG. 5.

The memory controller 115 may receive instructions from the host 105, and may communicate with the memory array 120, such as to transfer data to (e.g., write) or from (e.g., read), or to erase one or more of the memory cells, planes, sub-blocks, blocks, or pages of the memory array 120. For example, the memory controller 115 includes processing circuitry, which may include one or more processors which, when present, operate to execute instructions stored in the memory device. For purposes of the present examples, the instructions will be discussed as firmware, though instructions may also be present as software; and all or some portion of the described functions may also be implemented in circuitry including one or more components or integrated circuits.

For example, the memory controller 115 may include one or more memory control units, circuits, or components configured to control access across the memory array 120 and to provide a translation layer between the host 105 and the memory device 110. Additionally, the memory controller may include a memory interface to interface with the associated memory devices. In some examples, the memory interface may an Open NAND Flash Interface (ONFI). Although the memory controller 115 is here illustrated as part of the memory device 110 package, other configurations may be employed, such as the memory controller 115 being a component of the host 105 (e.g., as a discrete package on a system-on-a-chip of the host 105 that is separate from the memory service 110), or even implemented via a central processing unit (CPU) of the host 105.

The memory manager 125 may include, among other things, multiple components or integrated circuits and/or instructions for execution, associated with various memory management functions. In some embodiments, the functions of the memory manager 125 are implemented by a controller (or processor) executing the instructions of firmware which in some examples would be stored within the memory controller 115. In other examples, memory manager 125 can be implemented at least in part by one or more processors within memory controller 115, which may execute instructions stored in the memory array 120. Similarly, the management tables 130 can be stored on the memory controller 115 or in memory array 120. In in such examples the instructions and/or management tables 130 may be stored in certain blocks of the NAND die stack 120 and loaded into the working memory of memory controller 115 during operation.

For purposes of the present description, example memory operation and management functions will be described in the context of NAND memory. Persons skilled in the art will recognize that other forms of non-volatile memory may have analogous memory operations or management functions. Such NAND management functions include wear leveling, garbage collection, reclamation, error detection or correction, block retirement, or one or more other memory management functions. The memory manager 125 may parse or format host commands (e.g., commands received from a host) into device commands (e.g., commands associated with operation of the memory array 120, etc.), or generate device commands (e.g., to accomplish various memory management functions) for the array controller 135 or one or more other components of the memory device 110. Such internally generated operations, such as garbage collection, wear leveling, etc. can result in operations being performed which can provide an opportunity for power management operations as described herein, in the same manner that externally directed memory operations provide.

The memory manager 125 may include a set of management tables 130 configured to maintain various information associated with one or more components of the memory device 110 (e.g., various information associated with a memory array or one or more memory cells coupled to the memory controller 115). For example, the management tables 130 may include information regarding block age, block erase count, error history, or one or more error counts (e.g., a write operation error count, a read bit error count, a read operation error count, an erase error count, etc.) for one or more blocks of memory cells coupled to the memory controller 115. In certain examples, if the number of detected errors for one or more of the error counts is above a threshold, the bit error may be referred to as an uncorrectable bit error. The management tables 130 may maintain a count of correctable or uncorrectable bit errors, among other things. In an example, the management tables 130 may include translation tables or a logical-to-physical (L2P) mapping.

The array controller 135 may include power management circuitry 145 which may include at least a portion of a processor of the memory controller 115, and which, in selected implementations may include additional hardware circuitry configured to perform the power management functions as described herein. As will be discussed in more detail below, these power management functions may include placing circuitry, for example a processor or processor core, into a lower power mode while the NAND memory operations are being performed; and to toggle such circuitry out of the lower power mode in response to an event identified externally to such circuitry.

The array controller 135 may further include, among other things, circuitry or components configured to control memory operations associated with writing data to, reading data from, or erasing one or more memory cells of the memory device 110 coupled to the memory controller 115. The memory operations may be based on, for example, host commands received from the host 105, or internally generated by the memory manager 125 (e.g., in association with wear leveling, error detection or correction, etc.).

The array controller 135 may further include an error correction code (ECC) component 140, which may include, among other things, an ECC engine or other circuitry configured to detect or correct errors associated with writing data to or reading data from one or more memory cells of the memory device 110 coupled to the memory controller 115. The memory controller 115 may be configured to actively detect and recover from error occurrences (e.g., bit errors, operation errors, etc.) associated with various operations or storage of data based on the ECC data maintained by the array controller 135. This enables the memory controller 115 to maintain integrity of the data transferred between the host 105 and the memory device 110 or maintain integrity of stored data. Part of this integrity maintenance may include removing (e.g., retiring) failing memory resources (e.g., memory cells, memory arrays, pages, blocks, etc.) to prevent future errors.

The memory array 120 may include several memory cells arranged in, for example, devices, planes, sub-blocks, blocks, or pages. As one example, a 48 GB TLC NAND memory device may include 18,592 bytes (B) of data per page (16,384+2208 bytes), 1536 pages per block, 548 blocks per plane, and 4 or more planes per device. As another example, a 32 GB MLC memory device (storing two bits of data per cell (i.e., 4 programmable states)) may include 18,592 bytes (B) of data per page (16,384+2208 bytes), 1024 pages per block, 548 blocks per plane, and 4 planes per device, but with half the required write time and twice the program/erase (P/E) cycles as a corresponding TLC memory device. Other examples may include other numbers or arrangements. In some examples, a memory device, or a portion thereof, may be selectively operated in SLC mode, or in a desired MLC mode (such as TLC, QLC, etc.).

In operation, data is typically written to or read from the NAND memory device 110 in pages and erased in blocks. However, one or more memory operations (e.g., read, write, erase, etc.) may be performed on larger or smaller groups of memory cells, as desired. The data transfer size of a NAND memory device 110 is typically referred to as a page, whereas the data transfer size of a host is typically referred to as a sector. In some examples, the memory array may comprise a number of NAND dies and one or more functions of the memory controller 115 for a particular NAND die may be implemented on an on-die controller on that particular die. Other organizations and delineations of control functionality may also be utilized, such as a controller for each die, plane, superblock, block, page, and the like.

Although a page of data may include a number of bytes of user data (e.g., a data payload including a number of sectors of data) and its corresponding metadata, the size of the page often refers only to the number of bytes used to store the user data. As an example, a page of data having a page size of 4 KB may include 4 KB of user data (e.g., 8 sectors assuming a sector size of 512 B) as well as a number of bytes (e.g., 32 B, 54 B, 224 B, etc.) of metadata corresponding to the user data, such as integrity data (e.g., error detecting or correcting code data), address data (e.g., logical address data, etc.), or other metadata associated with the user data.

Different types of memory cells or memory arrays 120 may provide for different page sizes or may require different amounts of metadata associated therewith. For example, different memory device types may have different bit error rates, which may lead to different amounts of metadata necessary to ensure integrity of the page of data (e.g., a memory device with a higher bit error rate may require more bytes of error correction code data than a memory device with a lower bit error rate). As an example, an MLC NAND flash device may have a higher bit error rate than a corresponding SLC NAND flash device. As such, the MLC device may require more metadata bytes for error data than the corresponding SLC device.

Figure 2:
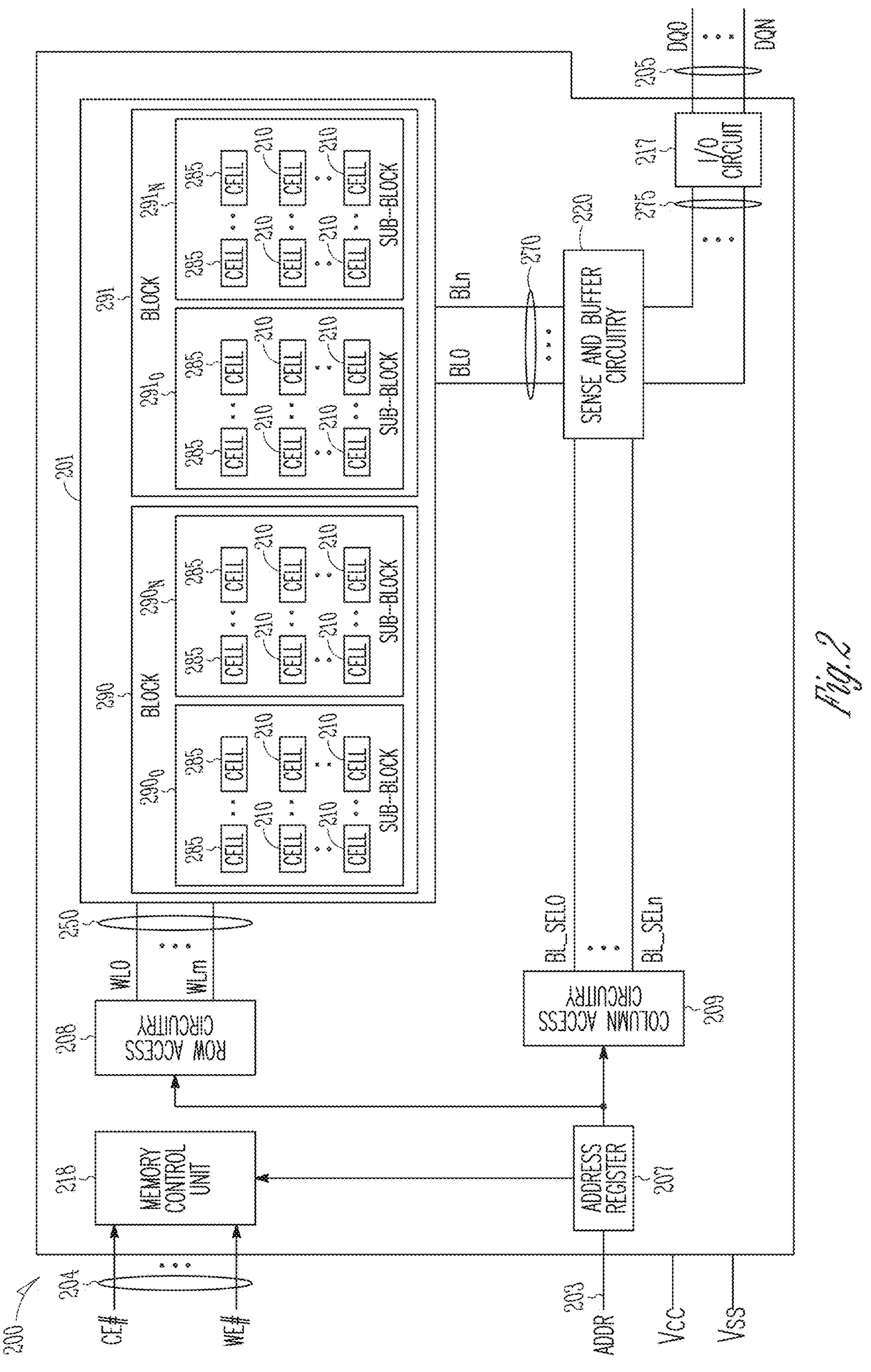
FIG. 2 is a block diagram of an apparatus in the form of a memory device including non-volatile memory cells according to some examples described herein.

FIG. 2 shows a block diagram of an example memory device 200 suitable for use as memory device 110 in FIG. 1A. The memory device can include non-volatile memory cells having mixed memory cell types integrated in the same integrated circuit (IC) chip, according to some examples described herein. Memory device 200 can include a memory array (or multiple memory arrays) 201 containing memory cells 210 and 285. In the physical structure of memory device 200, memory cells 210 and 285 can be arranged vertically (e.g., stacked over each other) over a substrate of memory device 200 (e.g., a semiconductor substrate of an IC chip that includes memory device 200). Memory cells 210 and 285 can include non-volatile cells. Memory cells 210 and 285 can have different non-volatile memory cell types. For example, memory cells 210 can include floating gate memory cells, charge trap memory cells, or other types of non-volatile memory cells. Memory cells 285 can include ferroelectric memory cells, phase change memory cells, resistive memory cells, conduction bridge memory cells, and spin-transfer-torque magnetic random access memory (STT-MRAM) cells, or other types of non-volatile memory cells.

As shown in FIG. 2, memory cells 210 and 285 can be arranged in blocks (memory cell blocks), such as blocks 290 and 291. Each of blocks 290 and 291 can include sub-blocks. For example, block 290 can include sub-blocks $\mathbf{290}_0$ and $\mathbf{290}_n$, and block 291 can include sub-blocks $\mathbf{291}_0$ and $\mathbf{291}_n$. Each of sub-blocks $\mathbf{290}_0$, $\mathbf{290}_n$, $\mathbf{291}_0$, and $\mathbf{291}_n$ can include a combination of memory cells 210 and 285. FIG. 2 shows memory device 200 having two blocks 290 and 291 and two sub-blocks in each of the blocks as an example. Memory device 200 can have more than two blocks and more than two sub-blocks in each of the blocks.

The memory cells can be included in memory planes. Different portions of a memory die can be referred to as different planes or plane groups (e.g., a group of two or more planes can constitute a plane group) of a same die. In an illustrative example intended to be non-limiting a memory device may include four memory dies with each die having two planes for a total of eight planes. Commands to the different planes of the same die may execute simultaneously. The memory cells 210 and 285 can be arranged in, for example, a number of devices, semi-conductor dies, planes, sub-blocks, blocks, or pages. More than one plane, sub-block, block, or page can be included on one memory die.

As shown in FIG. 2, memory device 200 can include access lines (which can include word lines) 250 and data lines (which can include bit lines) 270. Access lines 250 can carry signals (e.g., word line signals) WL0 through WLm. Data lines 270 can carry signals (e.g., bit line signals) BL0 through BLn. Memory device 200 can use access lines 250 to selectively access sub-blocks $\mathbf{290}_0$, $\mathbf{290}_n$, $\mathbf{291}_0$, and $\mathbf{291}_n$ of blocks 290 and 291 and data lines 270 to selectively exchange information (e.g., data) with memory cells 210 of blocks 290 and 291.

Memory device 200 can include an address register 207 to receive address information (e.g., address signals) ADDR on lines (e.g., address lines) 203. Memory device 200 can include row access circuitry 208 and column access circuitry 209 that can decode address information from address register 207. Based on decoded address information, memory device 200 can determine which memory cells 210 of which sub-blocks of blocks 290 and 291 are to be accessed during a memory operation. Memory device 200 can perform a read operation to read (e.g., sense) information (e.g., previously stored information) in memory cells 210, or a write (e.g., program) operation to store (e.g., program) information in memory cells 210. Memory device 200 can use data lines 270 associated with signals BL0 through BLn to provide information to be stored in memory cells 210 or obtain information read (e.g., sensed) from memory cells 210. Memory device 200 can also perform an erase operation to erase information from some or all of memory cells 210 of blocks 290 and 291.

Memory device 200 can include a memory controller 218 or internal memory controller (which can include processing circuitry components such as processor 219, a state machine (e.g., finite state machine), register circuits, and other components) configured to control memory operations (e.g., read, write, and erase operations) of memory device 200 based on control signals on lines 204. Examples of the control signals on lines 204 include one or more clock signals and other signals (e.g., a chip enable signal CE #, a write enable signal WE #) to indicate which operation (e.g., read, write, erase operation, erase-verify operation) memory device 200 can perform. The memory controller 218 can be included in the same integrated circuit chip as the memory cells. In some examples, the memory cells are NAND memory cells included in an integrated circuit die and the memory controller 218 is included in the same integrated circuit die as the NAND memory cells.

Memory device 200 can include sense and buffer circuitry 220 that can include components such as sense amplifiers and page buffer circuits (e.g., data latches). Sense and buffer circuitry 220 can respond to signals BL_SEL0 through BL_SELn from column access circuitry 209. Sense and buffer circuitry 220 can be configured to determine (e.g., by sensing) the value of information read from memory cells 210 (e.g., during a read operation) of blocks 290 and 291 and provide the value of the information to lines (e.g., global data lines) 275. Sense and buffer circuitry 220 can also can be configured to use signals on lines 275 to determine the value of information to be stored (e.g., programmed) in memory cells 210 of blocks 290 and 291 (e.g., during a write operation) based on the values (e.g., voltage values) of signals on lines 275 (e.g., during a write operation).

Memory device 200 can include input/output (I/O) circuitry 217 to exchange information between memory cells 210 of blocks 290 and 291 and lines (e.g., I/O lines) 205. Signals DQ0 through DQN on lines 205 can represent information read from or stored in memory cells 210 of blocks 290 and 291. Lines 205 can include nodes within memory device 200 or pins (or solder balls) on a package where memory device 200 can reside. Other devices external to memory device 200 (e.g., an external memory controller, or a processor) can communicate with memory device 200 through lines 203, 204, and 205.

Memory device 200 can receive a supply voltage, including supply voltages Vcc and Vss. Supply voltage Vss can operate at a ground potential (e.g., having a value of approximately zero volts). Supply voltage Vcc can include an external voltage supplied to memory device 200 from an external power source such as a battery or alternating current to direct current (AC-DC) converter circuitry.

Each of memory cells 210 can be programmed individually or collectively to one or a number of programmed states. For example, a single-level cell (SLC) can represent one of two programmed states (e.g., 1 or 0), representing one bit of data. However, flash memory cells can also be multi-level cells (MLCs) that represent one of more than two programmed states, allowing the manufacture of higher density memories without increasing the number of memory cells, as each cell can represent more than one binary digit (e.g., more than one bit).

In another example, each of memory cells 210 can be programmed to store information representing a value for multiple bits, such as one of four possible values "00", "01", "10", and "11" of two bits, one of eight possible values "000", "001", "010", "011", "100", "101", "110", and "111" of three bits, or one of other values of another number of multiple bits. A cell that has the ability to store multiple bits is sometimes called a multi-level cell (or multi-state cell). MLC is used herein in its broader context, to refer to any memory cell that can store more than one bit of data per cell (i.e., that can represent more than two programmed states, including a triple-level cell (TLC) can refer to a memory cell that can store three bits of data per cell (e.g., one of eight programmed states), and a quad-level cell (QLC) can store four bits of data per cell).

Memory device 200 can include a non-volatile memory device, such that memory cells 210 and 285 can retain information stored thereon when power (e.g., voltage Vcc, Vss, or both) is disconnected from memory device 200. For example, memory device 200 can be a flash memory device, such as a NAND flash (e.g., 3-dimensional (3-D) NAND) or a NOR flash memory device, or another kind of memory device, such as a variable resistance memory device (e.g., a phase change memory device or a resistive RAM (Random Access Memory) device). One of ordinary skill in the art may recognize that memory device 200 may include other components not shown in FIG. 2 so as not to obscure the example embodiments described herein.

Read disturb errors can be caused by read stress on a NAND word-line n (WL n) that disturbs the neighboring word lines especially the adjacent word lines WL n−1 and WL n+1. This can result in a high number of error bits for the pages of memory connected to WL n−1 and WL n+1. One approach to managing read disturb events is to manage the read count of each physical block of memory. In such approaches, a read count threshold is set for each block of memory. The memory system tracks the read count per each NAND block. When the read count of a block reaches the read count threshold, the memory system scans the whole block for errors. If the number of errors identified in the scan reaches a predefined error count threshold, the block of memory may be unreliable, and the memory system relocates the whole physical block of memory into another new block of memory. If the number of errors identified in the scan is less than the predefined error count threshold, the block of memory is considered to be performing well, and the memory system increases the read count threshold required before another error scan is performed.

One disadvantage of this approach is that at least two system read disturb management tables are needed by the memory controller to manage the read disturb events; a read count table and a read count threshold table. The tables include a read count and a read count threshold for each memory block and each count is characterized by four bytes of SRAM in the memory controller. For a memory system with 1,000 memory blocks, the read disturb management tables occupy 1,000*4Bytes*2=8,000 Bytes. As a resource, the SRAM is limited because of the required expense and power consumption for the memory controller. More system tables in SRAM means the system needs to write more data into NAND flash when entering the power saving mode and to read more data from NAND flash when exiting power saving mode. This can impact the latency of entering and exiting the power saving mode also increases read/write events on the NAND flash.

Another disadvantage with such approaches is that the smallest unit at which the errors are managed is the block level. When the read count for a block reaches the read count threshold, the entire block is scanned. This will impact the latency of host read operations and also cause more read disturb effects on the scanned block. As memory technology advances, NAND block size will increase, and the larger block size will result in longer latency for the host operations. Read disturb events are typically local events (e.g., a read on WL n causing an effect on adjacent word lines WL n+1 and/or WL n−1). Thus, the memory system scans an entire block looking for a localized event. Additionally, when the error scan reaches a predefined error count threshold, the memory system moves the whole block of data to a new memory block, even though the disturb events that caused the errors may be localized. Addressing localized read disturb events using granularity at the block level is not an efficient use of system resources.

In addition to being a localized effect, a read disturb effect is a gradual rather than a sudden process. The error bit count of read disturbed pages increases slowly with the host read stress. Rarely do read disturb events suddenly appear everywhere throughout the memory. For this reason, the management of read disturb events can be more efficient by managing the events at a level smaller than an entire block of memory.

FIG. 3 is a flow diagram of an example of a method 300 of operating a memory device to monitor and address memory cell functionality on a relatively finer-grained basis. Methods described herein can be implemented to minimize the problems with conventional read disturb monitoring, as discussed above. Method 300 is performed, for example, using a memory controller such as memory controller 218 in FIG. 2. The method overcomes the disadvantages described previously herein by doing away with the system read disturb management tables and by only scanning and relocating a few pages of memory at a time. The read count threshold used to monitor read operations is a dynamic number changed by the microcontroller.

At 305, a threshold number of read operations to be performed on a block of memory cells is selected. The memory controller performs read operations until the threshold number of read operations is reached. The read operations that are counted are physical read operations and not host read commands.

At 310, the memory controller scans for errors in response to the number of read operations reaching the selected threshold number. Instead of scanning a whole block of memory, only a few memory pages are scanned. In some examples, the memory pages chosen for scanning are associated with the last read operation performed to reach the threshold. For instance, the memory pages of the adjacent word lines to the word line used in the last read operation are scanned. In other words, if word line WL n is the word line used in the read operation, memory pages attached to each of WL n+1 and WL n−1 are scanned for errors, or a total of two pages are scanned. In some examples, a weaker word line, WL m, is also chosen for scanning in addition to the adjacent word lines of the word line used in the last host read operation. A weaker word line may be a word line having a faster increase in the number of errors compared to other word lines. A list of weaker word lines may be maintained by the memory controller. A word line for scanning is selected (e.g., randomly) from the maintained list of weaker word lines. In this case, three pages are scanned. The scanning is independent of the die and the plane, and the scanning can be done independently on different planes of the device, or can be done in parallel across multiple planes.

After the scanning is performed, at 315 the memory controller changes the read count threshold number to a new number and read operations are resumed until the new read count threshold number is reached. At this point, the next error scan is performed. The process repeats the selecting of the read count threshold, the performing of the read operations, and the error scanning.

When a scan is performed, the number of errors found during the scan is compared to a predefined error count threshold. When the error count threshold is reached during a scan, the valid data of the memory pages scanned is relocated to a new block of memory cells. The entire virtual block of memory does not have to be moved, only the valid data of the scanned world lines because the read disturb event is a localized effect. In some examples, the error scanning includes error detection and error correction (e.g., using an error code correction engine of the memory controller). Valid data and corrected data are relocated to the new block of memory cells.

The threshold number of read operations to be performed before the error scanning is a dynamic number selected by the memory controller rather than a fixed static number. The read count threshold number may be selected randomly by using a random function of the memory controller. The threshold number is a random number chosen from a range of numbers. Over many intervals of read operations and scanning, the average value of the threshold number by the random selection will be about the median value. For example, if the memory controller selects a random number for read operations to be performed from a range of 1 to N-max, the average value of the threshold number of read operations will be N-max/2.

Figure 4:
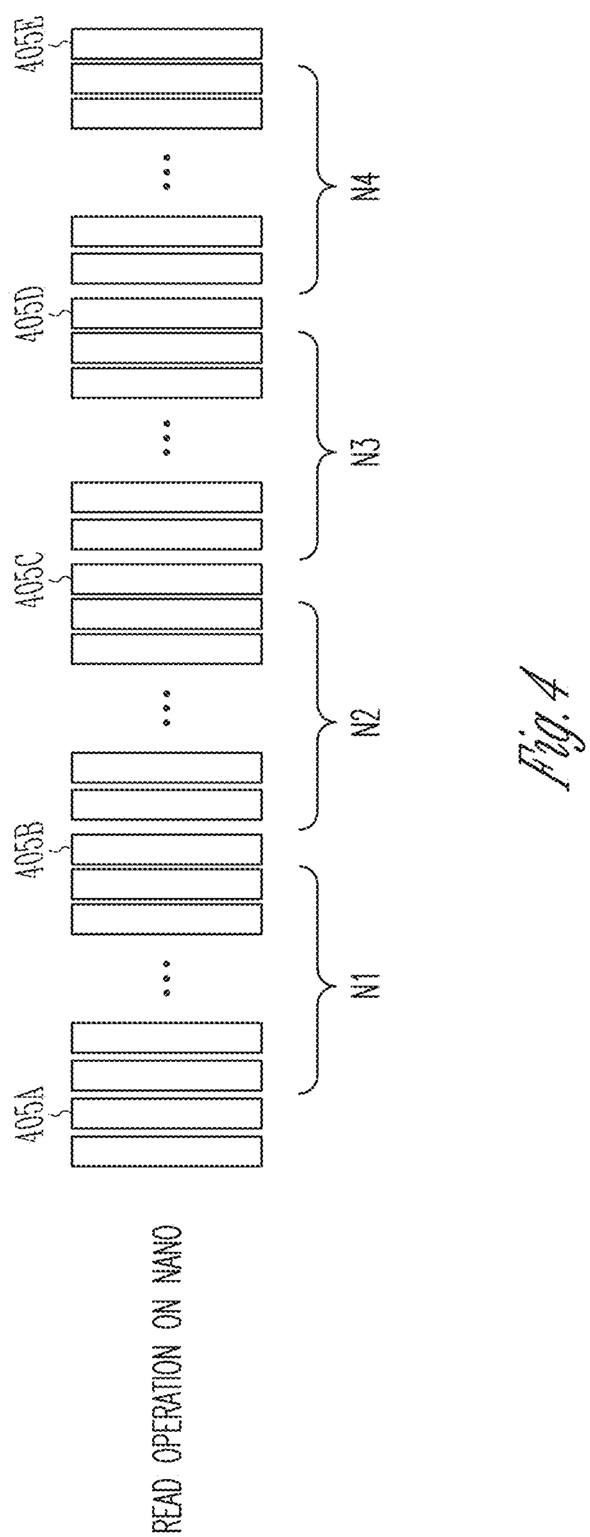
FIG. 4 is a diagram illustrating an example of flow of read operations and error scanning according to some examples described herein.

FIG. 4 is a diagram illustrating the flow of read operations and error scanning performed by the memory controller. The vertical bars represent read operations and scan operations. After error scan operation 405A, the memory controller selects a random number of read operations N1 as the threshold from a range of numbers (1 . . . N-max). After the interval of N1 read operations, the memory controller initiates error scan operation 405B and selects a new random number of read operations N2 for the threshold from the range of numbers (1 . . . N-max). The flow continues after scan operation 405C with intervals of N3 read operations and N4 read operations between scans 405D and 405E.

A memory page group including a memory page attached to each of WL n+1, WL n−1 and WL m is scanned for errors after the threshold number of physical read operations is reached. WL n is a word line associated with the last read operation and word line WL m is selected from a list of weak word lines maintained by the memory controller.

The size of the range (1 . . . N-max) for choosing the random numbers can be configured (e.g., by programming or by firmware) based on considerations such as the type of memory and its susceptibility to read disturb events, or to the conditions under which the memory is used. For example, the size of the range of numbers may be set according to the number of program/erase cycles of the memory cells, or in other cases may be based on monitored conditions, for example temperature of an individual memory die or portions thereof (or a temperature of multiple memory die, or a memory die package). The memory controller may monitor the program/erase count of the block, and select the range of threshold numbers (e.g., select a value of N-max) according to the program/erase count.

The techniques described herein improve efficiency of read disturb event management in a memory device by reducing unnecessary error scanning and data relocating. The techniques also reduce the amount of SRAM used by the memory controller in managing the read disturb events and simplify the read disturb management algorithm.

Figure 5:
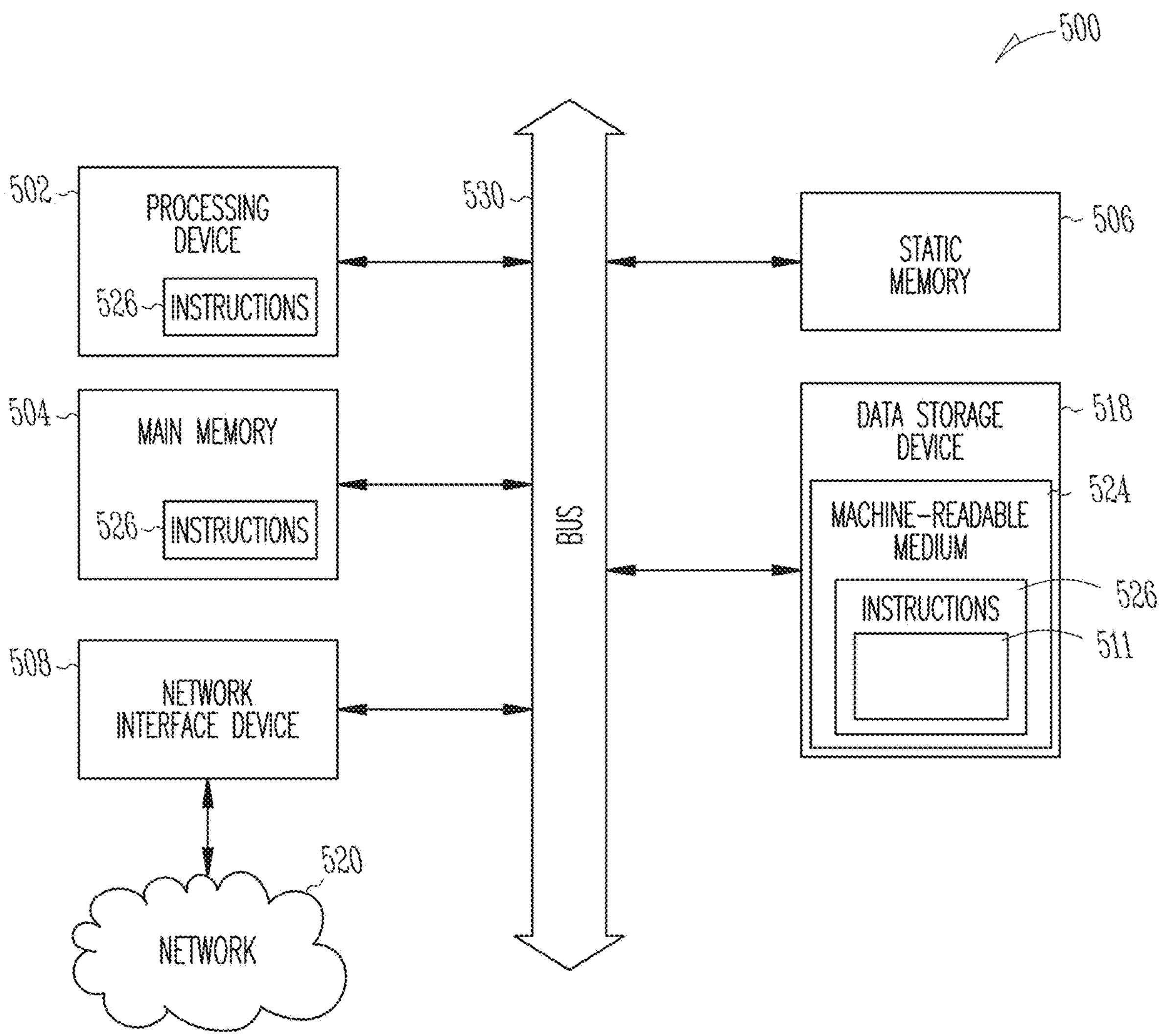
FIG. 5 illustrates a block diagram of an example machine according to some examples described herein.

FIG. 5 illustrates a block diagram of an example machine 500 upon which any one or more of the techniques (e.g., methodologies) discussed herein may perform, such as the described finer trim programming operations for extreme operating temperatures for example. In alternative examples, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environment. The machine 500 may be a personal computer (PC), a tablet PC, a set-top box (STB), a personal digital assistant (PDA), a mobile telephone, a web appliance, an IoT device, automotive system, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The embodiments and examples, as described herein, may include, or may operate by, logic, components, devices, packages, or mechanisms. Circuitry is a collection (e.g., set) of circuits implemented in tangible entities that include hardware (e.g., simple circuits, gates, logic, etc.). Circuitry membership may be flexible over time and underlying hardware variability. Circuitries include members that may, alone or in combination, perform specific tasks when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer-readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable participating hardware (e.g., the execution units or a loading mechanism) to create members of the circuitry in hardware via the variable connections to carry out portions of the specific tasks when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time.

The machine (e.g., computer system) 500 (e.g., the host 105, the memory device 110 of FIG. 1, etc.) may include a processing device 502 (e.g., a hardware processor, a central processing unit (CPU), a graphics processing unit (GPU), a hardware processor core, or any combination thereof, such as a memory controller of the memory device 110, etc.), a main memory 504 (e.g., read-only memory (ROM), flash memory, dynamic random-access memory (DRAM) such as synchronous DRAM (SDRAM) or Rambus DRAM (RDRAM), etc.), a static memory 506 (e.g., flash memory, static random-access memory (SRAM), etc.), and a data storage system 518, some or all of which may communicate with each other via an interlink (e.g., bus) 530.

The processing device 502 can represent one or more general-purpose processing devices such as a microprocessor, a central processing unit, or the like. More particularly, the processing device 502 can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 502 can also be one or more special-purpose processing devices such as an application specific integrated circuit (ASIC), a field programmable gate array (FPGA), a digital signal processor (DSP), network processor, or the like. The processing device 502 can be configured to execute instructions 526 for performing the operations and steps discussed herein. The machine 500 can further include a network interface device 508 to communicate over a network 520.

The data storage system 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 or within the processing device 502 during execution thereof by the machine 500, the main memory 504 and the processing device 502 also constituting machine-readable storage media. The machine-readable storage medium 524, the data storage system 518, or the main memory 504 can correspond to the memory device 110 of FIG. 1. In one implementation, the instructions 526 include instructions 511 contained in firmware to implement functionality corresponding to monitoring for read disturb events of the memory device (e.g., the operations of FIG. 3 or FIG. 4).

While the machine-readable storage medium 524 is shown in an example implementation to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media. In an example, a massed machine-readable medium comprises a machine-readable medium with a plurality of particles having invariant (e.g., rest) mass. Accordingly, massed machine-readable media are not transitory propagating signals. Specific examples of massed machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The machine 500 may further include a display unit, an alphanumeric input device (e.g., a keyboard), and a user interface (UI) navigation device (e.g., a mouse). In an example, one or more of the display unit, the input device, or the UI navigation device may be a touch screen display. The machine a signal generation device (e.g., a speaker), or one or more sensors, such as a global positioning system (GPS) sensor, compass, accelerometer, or one or more other sensor. The machine 500 may include an output controller, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The instructions 526 (e.g., software, programs, an operating system (OS), etc.) or other data are stored on the data storage device 518 can be accessed by the main memory 504 for use by the processing device 502. The main memory 504 (e.g., DRAM) is typically fast, but volatile, and thus a different type of storage than the data storage device 518

(e.g., an SSD), which is suitable for long-term storage, including while in an "off" condition. The instructions 526 or data in use by a user or the machine 500 are typically loaded in the main memory 504 for use by the processing device 502. When the main memory 504 is full, virtual space from the data storage device 518 can be allocated to supplement the main memory 504; however, because the data storage device 518 device is typically slower than the main memory 504, and write speeds are typically at least twice as slow as read speeds, use of virtual memory can greatly reduce user experience due to storage device latency (in contrast to the main memory 504, e.g., DRAM). Further, use of the data storage device 518 for virtual memory can greatly reduce the usable lifespan of the data storage device 518.

In contrast to virtual memory, virtual memory compression (e.g., the Linux™ kernel feature "ZRAM") uses part of the memory as compressed block storage to avoid paging to the data storage device 518. Paging takes place in the compressed block until it is necessary to write such data to the data storage device 518. Virtual memory compression increases the usable size of the main memory 504, while reducing wear on the data storage device 518.

Storage devices optimized for mobile electronic devices, or mobile storage, traditionally include MMC solid-state storage devices (e.g., micro Secure Digital (microSD™) cards, etc.). MMC devices include a number of parallel interfaces (e.g., an 8-bit parallel interface) with a host (e.g., a host device), and are often removable and separate components from the host. In contrast, eMMC™ devices are attached to a circuit board and considered a component of the host, with read speeds that rival serial ATA™ (Serial AT (Advanced Technology) Attachment, or SATA) based SSD devices. However, demand for mobile device performance continues to increase, such as to fully enable virtual or augmented-reality devices, utilize increasing networks speeds, etc. In response to this demand, storage devices have shifted from parallel to serial communication interfaces. Universal Flash Storage (UFS) devices, including controllers and firmware, communicate with a host using a low-voltage differential signaling (LVDS) serial interface with dedicated read/write paths, further advancing greater read/write speeds.

The instructions 524 may further be transmitted or received over a network 520 using a transmission medium via the network interface device 508 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 508 may include one or more physical jacks (e.g., Ethernet, coaxial, or phone jacks) or one or more antennas to connect to the network 520. In an example, the network interface device 508 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 500, and includes digital or analog communications signals or other intangible medium to facilitate communication of such software.

The above detailed description includes references to the accompanying drawings, which form a part of the detailed description. The drawings show, by way of illustration, specific embodiments in which the invention can be practiced. These embodiments are also referred to herein as "examples". Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, unless stated otherwise the term "or" is used to refer to a nonexclusive or, such that "A or B" may include "A but not B," "B but not A," and "A and B," unless otherwise indicated. In the appended claims, the terms "including" and "in which" are used as the plain-English equivalents of the respective terms "comprising" and "wherein". Also, in the following claims, the terms "including" and "comprising" are open-ended. A system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

In various examples, the components, controllers, processors, units, engines, or tables described herein can include, among other things, physical circuitry or firmware stored on a physical device. As used herein, "processor" means any type of computational circuit such as, but not limited to, a microprocessor, a microcontroller, a graphics processor, a digital signal processor (DSP), or any other type of processor or processing circuit, including a group of processors or multi-core devices.

Operating a memory cell, as used herein, includes reading from, writing to, or erasing the memory cell. The operation of placing a memory cell in an intended state is referred to herein as "programming," and can include both writing to or erasing from the memory cell (e.g., the memory cell may be programmed to an erased state).

According to one or more embodiments of the present disclosure, a memory controller (e.g., a processor, controller, firmware, etc.) located internal or external to a memory device, is capable of determining (e.g., selecting, setting, adjusting, computing, changing, clearing, communicating, adapting, deriving, defining, utilizing, modifying, applying, etc.) a quantity of wear cycles, or a wear state (e.g., recording wear cycles, counting operations of the memory device as they occur, tracking the operations of the memory device it initiates, evaluating the memory device characteristics corresponding to a wear state, etc.)

According to one or more embodiments of the present disclosure, a memory access device may be configured to provide wear cycle information to the memory device with each memory operation. The memory device control circuitry (e.g., control logic) may be programmed to compensate for memory device performance changes corresponding to the wear cycle information. The memory device may receive the wear cycle information and determine one or more operating parameters (e.g., a value, characteristic) in response to the wear cycle information.

Method examples described herein can be machine, device, or computer-implemented at least in part. Some examples can include a computer-readable medium, a device-readable medium, or a machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, the code can be tangibly stored on one or more volatile or non-volatile tangible computer-readable media, such as during execution or at other times. Examples of these tangible computer-readable media can include, but are not limited to, hard disks, removable magnetic disks, removable optical disks (e.g., compact discs and digital video disks), magnetic cassettes, memory cards or sticks, random access memories (RAMs), read only memories (ROMs), solid state drives (SSDs), Universal Flash Storage (UFS) device, embedded MMC (eMMC) device, and the like.

Example 1 includes subject matter (such as a memory device) comprising a memory array including memory cells and a memory controller operatively coupled to the memory array. The memory controller includes a processor configured to initiate read operations to the memory array, compare the number of read operations performed on a block of memory cells of the memory array, to a predetermined threshold number of read operations, scan first, second and third memory pages of the block of memory cells for errors in response to reaching the threshold number of read operations for the block, wherein the first memory page is attached to a first activation line associated with a previous read operation included in the threshold number of read operations, and the second memory page and the third memory page are attached to different neighboring activation lines of the first activation line, and iteratively change the threshold number to a new threshold number, perform the new threshold number of read operations on the block of memory cells, and error scan first, second and third memory pages associated with the last read operation of the new threshold number of read operations.

In Example 2, the memory device of Example 1 optionally includes a processor configured to compare a number of errors in the first, second, and third memory pages of the block of memory cells to a predetermined error count, and relocate valid data of the scanned first, second, and third pages to a different block of memory cells of the memory array when the error count of the first, second, and third pages reaches the predetermined error count.

In Example 3, the subject matter of Example 2, optionally includes a processor configured to correct errors of the scanned first, second, and third pages, and relocate corrected data and the valid data to the different block of memory cells.

In Example 4, the subject matter of one or any combination of Examples 1-3 optionally includes a processor configured to select the first memory page as the memory page attached to a first activation line associated with a last physical read operation of the threshold number of read operations.

In Example 5, the subject matter of one or any combination of Examples 1-3 optionally includes processor configured to select the first memory page as a memory page attached to a first activation line associated with a previous read operation and is included in a list of weaker activation lines.

In Example 6, the subject matter of one or any combination of Examples 1-5 optionally includes a processor configured to iteratively change the value of the threshold number according to a random function.

In Example 7, the subject matter of one or any combination of Examples 1-6 optionally includes a processor configured to monitor the number of erase operations of the block of memory cells, iteratively change the threshold number by selecting a random number for the threshold number from a range of threshold numbers, and select the range of threshold numbers according to the number of erase operations.

In Example 8, the subject matter of one or any combination of Examples 1-7 optionally includes a processor configured to initialize the memory device; error scan, for a first N read operations after the initializing, memory cells of a page connected to an activation line of the read operation, and memory cells of pages connected to neighboring activation lines, wherein N is an integer greater than zero; and set the threshold number of read operation to the random number after the N read operations.

Example 9 includes subject matter (such as a method of operating a memory device) or can optionally be combined with one or any combination of Examples 1-8 to include such subject matter, comprising selecting a threshold number of read operations to be performed on a block of memory cells of the memory device, wherein the block of memory cells includes multiple pages of memory cells; scanning first, second and third pages of the multiple pages for errors in response to reaching the threshold number of read operations, wherein the first page is attached to a first activation line associated with a last read operation of the threshold number of read operations, and the second page and the third page are attached to different neighboring activation lines of the first activation line; and iteratively changing the threshold number to a new threshold number, performing the new threshold number of read operations on the block of memory cells, and error scanning first, second and third pages associated with the last read operation of the new threshold number of read operations.

In Example 10, the subject matter of Example 9 optionally includes relocating valid data of the scanned first, second, and third pages to a different block of memory cells when an error count during the scanning of the first, second, and third pages reaches a predetermined error count.

In Example 11, the subject matter of one or both of Examples 9 and 10 optionally includes correcting errors of the scanned first, second, and third pages, and relocating corrected data and the valid data to the different block of memory cells.

In Example 12, the subject matter of one or any combination of Examples 9-11 optionally includes changing the value of the threshold number according to a random function.

In Example 13, the subject matter of one or any combination of Examples 9-12 optionally includes monitoring the number of erase operations of the block of memory cells, and selecting a random number for the threshold number from a range of threshold numbers and setting the range of threshold numbers according to the number of erase operations.

In Example 14, the subject matter of one or any combination of Examples 9-13 optionally includes initializing the memory device, error scanning, for a first N read operations after the initializing, memory cells of a page connected to an activation line of the read operation, and memory cells of pages connected to neighboring activation lines, wherein N is an integer greater than zero, and setting the threshold number to a random number after the first N read operations.

Example 15 includes subject matter (or can optionally be combined with one or any combination of Examples 1-14 to include such subject matter) such as a computer readable medium including instructions that, when performed by processing circuitry of a memory controller, cause the memory controller to perform acts comprising selecting a threshold number of read operations to be performed on a block of memory cells of a memory array operatively coupled to the memory controller, wherein the block of memory cells includes multiple pages of memory cells; scanning first, second and third pages of the multiple pages for errors in response to reaching the threshold number of read operations, wherein the first page is attached to a first activation line associated with a last read operation of the threshold number of read operations, and the second page and the third page are attached to different neighboring activation lines of the first activation line; iteratively changing the threshold number to a new threshold number, performing the new threshold number of read operations on the block of memory cells and error scanning first, second and third pages associated with the last read operation of the new threshold number of read operations.

In Example 16, the subject matter of Example 15 optionally includes instructions that cause the memory controller to relocate valid data of the scanned first, second, and third pages to a different block of memory cells when an error count during the scanning of the first, second, and third pages reaches a predetermined error count.

In Example 17, the subject matter of one or both of Examples 15 and 16 optionally includes instructions that cause the memory controller to correct errors of the scanned first, second, and third pages, and relocate corrected data and the valid data to the different block of memory cells.

In Example 18, the subject matter of one or any combination of Examples 15-17 optionally includes instructions that cause the memory controller to change the value of the threshold number according to a random function.

In Example 19, the subject matter of one or any combination of Examples 15-18 optionally includes instructions that cause the memory controller to monitor the number of erase operations of the block of memory cells, iteratively select a random number for the threshold number from a range of threshold numbers, and set the range of threshold numbers according to the number of erase operations.

In Example 20, the subject matter of one or any combination of Examples 15-19 optionally includes instructions that cause the memory controller to initialize the memory device, error scan, for a first N read operations after the initializing, memory cells of a page connected to an activation line of the read operation, and memory cells of pages connected to neighboring activation lines, wherein N is an integer greater than zero, and set the threshold number to a random number after the first N read operations.

These non-limiting Examples can be combined in any permutation or combination.

The invention claimed is:

1. A memory device comprising:

a memory array including memory cells;

a memory controller operatively coupled to the memory array and including a processor, the processor configured to:

initiate read operations to the memory array;

compare the number of read operations performed on a block of memory cells of the memory array, to a predetermined threshold number of read operations;

scan first, second and third memory pages of the block of memory cells for errors in response to reaching the threshold number of read operations for the block and not scanning when the threshold number of read operations is not reached, wherein the first memory page and the second memory page are attached to different neighboring access lines of a first access line used in a last read operation of the threshold number of read operations, the third memory page is attached to an access line experiencing more errors than the first and neighboring access lines, and wherein the first, second, and third memory pages are less than a number of memory pages tracked for the read operations; and iteratively change the threshold number to a new threshold number when the threshold number is reached regardless of whether errors are found by the scan, perform the new threshold number of read operations on the block of memory cells, and error scan first, second and third memory pages associated with the last read operation of the new threshold number of read operations.

2. The memory device of claim 1, wherein the processor is configured to:

compare a number of errors in the first, second, and third memory pages of the block of memory cells to a predetermined error count; and relocate valid data of the scanned first, second, and third pages to a different block of memory cells of the memory array when the error count of the first, second, and third pages reaches the predetermined error count.

3. The memory device of claim 2, wherein processor is configured to correct errors of the scanned first, second, and third pages, and relocate corrected data and the valid data to the different block of memory cells.

4. The memory device of claim 1, wherein the processor is configured to scan the memory page attached to the first access line.

5. The memory device of claim 1, wherein the third memory page is attached to an access line included in a list of weaker access lines having an increase in errors greater relative to other access lines.

6. The memory device of claim 1, wherein the processor is configured to iteratively change the value of the threshold number of read operations by iteratively selecting different values of threshold numbers between a predetermined minimum and maximum value of threshold numbers.

7. The memory device of claim 1, wherein the processor is configured to:

monitor the number of erase operations of the block of memory cells;

iteratively change the threshold number of read operations by iteratively selecting a different number for the threshold number from a range of threshold numbers between a predetermined minimum threshold number and a predetermined maximum threshold number; and set the predetermined minimum threshold number and the predetermined maximum threshold number according to the number of erase operations.

8. The memory device of claim 1, wherein the processor is configured to:

initialize the memory device;

error scan, for a first N read operations after the initializing, memory cells of a page connected to an access line of the read operation, and memory cells of pages connected to neighboring access lines, wherein N is an integer greater than zero; and set the threshold number of read operations to a number of read operations different from N after the N read operations.

9. A method of operating a memory device, the method comprising:

selecting a threshold number of read operations to be performed on a block of memory cells of the memory device, wherein the block of memory cells includes multiple pages of memory cells;

scanning first, second and third pages of the multiple pages for errors in response to reaching the threshold number of read operations and not scanning when the threshold number of read operations is not reached, wherein the first page and the second page are attached to different neighboring access lines of a first access line used in a last read operation of the threshold number of read operations, the third memory page is attached to an access line having more errors relative to the first and neighboring access lines, and wherein the first, second, and third memory pages are less than a number of memory pages tracked for the read operations; and iteratively changing the threshold number to a new threshold number when the threshold number is reached regardless of whether errors are found by the scanning, performing the new threshold number of read operations on the block of memory cells, and error scanning first, second and third pages associated with the last read operation of the new threshold number of read operations.

10. The method of claim 9, including:

relocating valid data of the scanned first, second, and third pages to a different block of memory cells when an error count during the scanning of the first, second, and third pages reaches a predetermined error count.

11. The method of claim 10, including:

correcting errors of the scanned first, second, and third pages; and relocating corrected data and the valid data to the different block of memory cells.

12. The method of claim 9, wherein the setting the threshold number and iteratively changing the threshold number includes changing the value of the threshold number of read operations by iteratively selecting different values of threshold numbers between a predetermined minimum and maximum value of threshold numbers.

13. The method of claim 9, including:

monitoring the number of erase operations of the block of memory cells; and wherein the setting the threshold number and iteratively changing the threshold number includes iteratively selecting a different number for the threshold number from a range of threshold numbers between a predetermined minimum threshold number and a predetermined maximum threshold number and setting the predetermined minimum threshold number and the predetermined maximum threshold number according to the number of erase operations.

14. The method of claim 9, including:

initializing the memory device;

error scanning, for a first N read operations after the initializing, memory cells of a page connected to an access line of the read operation, and memory cells of pages connected to neighboring access lines, wherein N is an integer greater than zero; and wherein the selecting the threshold number of read operations includes setting the threshold number to a number of read operations different from N after the first N read operations.

15. A non-transitory computer readable medium including instructions that, when performed by processing circuitry of a memory controller, cause the memory controller to perform acts comprising:

selecting a threshold number of read operations to be performed on a block of memory cells of a memory array operatively coupled to the memory controller, wherein the block of memory cells includes multiple pages of memory cells;

scanning first, second and third pages of the multiple pages for errors in response to reaching the threshold number of read operations and not scanning when the threshold number of read operations is not reached, wherein the first page and the second page are attached to different neighboring access lines of a first access line used in a last read operation of the threshold number of read operations, the third memory page is attached to an access line having more errors relative to the first and neighboring access lines, and wherein the first second and third memory pages are less than a number of memory pages tracked for the read operations; and iteratively changing the threshold number to a new threshold number when the threshold number is reached regardless of whether errors are found by the scanning, performing the new threshold number of read operations on the block of memory cells, and error scanning first, second and third pages associated with the last read operation of the new threshold number of read operations.

16. The non-transitory computer readable medium of claim 15, including instructions that cause the memory controller to relocate valid data of the scanned first, second, and third pages to a different block of memory cells when an error count during the scanning of the first, second, and third pages reaches a predetermined error count.

17. The non-transitory computer readable medium of claim 16, including instructions that cause the memory controller to:

correct errors of the scanned first, second, and third pages; and relocate corrected data and the valid data to the different block of memory cells.

18. The non-transitory computer readable medium of claim 15, including instructions that cause the memory controller to change the value of the threshold number of read operations by iteratively selecting different values of threshold numbers between a predetermined minimum and maximum value of threshold numbers.

19. The non-transitory computer readable medium of claim 15, including instructions that cause the memory controller to:

monitor the number of erase operations of the block of memory cells;

iteratively select a different number for the threshold number from a range of threshold numbers of read operations between a predetermined minimum threshold number and a predetermined maximum threshold number; and set the predetermined minimum threshold number and the predetermined maximum threshold number according to the number of erase operations.

20. The non-transitory computer readable medium of claim 15, including instructions that cause the memory controller to:

initialize the memory device;

error scan, for a first N read operations after the initializing, memory cells of a page connected to an access line of the read operation, and memory cells of pages connected to neighboring access lines, wherein N is an integer greater than zero; and set the threshold number of read operations to a number of read operations different from N after the N read operations.

* * * * *